(12) United States Patent
Bissacco et al.

(10) Patent No.: US 8,995,758 B1
(45) Date of Patent: Mar. 31, 2015

(54) CLASSIFYING FALSE POSITIVE DESCRIPTORS

(75) Inventors: Alessandro Bissacco, Los Angeles, CA (US); Ulrich Buddemeier, Sebastopol, CA (US); Hartmut Neven, Malibu, CA (US)

(73) Assignee: Google Inc., Mountain View, CA (US)

( * ) Notice: Subject to any disclaimer, the term of this patent is extended or adjusted under 35 U.S.C. 154(b) by 1530 days.

(21) Appl. No.: 12/489,341

(22) Filed: Jun. 22, 2009

Related U.S. Application Data

(60) Provisional application No. 61/074,536, filed on Jun. 20, 2008.

(51) Int. Cl.
*G06K 9/62* (2006.01)
*G06Q 30/06* (2012.01)

(52) U.S. Cl.
CPC ...................................... *G06Q 30/06* (2013.01)
USPC ........... 382/159; 382/181; 382/195; 382/201; 382/205; 382/219

(58) Field of Classification Search
None
See application file for complete search history.

(56) References Cited

U.S. PATENT DOCUMENTS

| | | | |
|---|---|---|---|
| 6,532,305 B1 * | 3/2003 | Hammen | 382/227 |
| 7,062,085 B2 | 6/2006 | Luo et al. | |
| 2007/0047787 A1 * | 3/2007 | Oakley et al. | 382/128 |

OTHER PUBLICATIONS

D.G. Lowe, Object recognition from local scale-invariant keypoints, 2003, International Journal of Compution Vision, vol. 20, pp. 99-110.*
Li et al., "Robust Scale-Invariant Feature Matching for Remote Sensing Image Registration", Feb. 2, 2009, IEEE Geosciene and Remote Sensing Letters, vol. 6. No. 2., pp. 287-291.*
Yi et al., "Multi-spectral remote image registration based on SIFT", Jan. 17, 2008, IEEE, Electronic Letters, vol. 44, No. 2., pp. 1-2.*
Carneiro, G., et al., "The Distinctiveness, Detectability, and Robustness of Local Image Features", *Proceedings of the 2005 IEEE Computer Society Conference on Computer Vision and Pattern Recognition (CVPR'05)*, IEEE Computer Society, Washington, D.C., 2005, 6 pages.

* cited by examiner

*Primary Examiner* — Sumati Lefkowitz
*Assistant Examiner* — David Perlman
(74) *Attorney, Agent, or Firm* — Fish & Richardson P.C.

(57) ABSTRACT

According to an embodiment, a method for filtering descriptors for visual object recognition is provided. The method includes identifying false positive descriptors having a local match confidence that exceeds a predetermined threshold and a global image match confidence that is less than a second threshold. The method also includes training at least one classifier to discriminate between the false positive descriptors and other descriptors. The method further includes filtering feature point matches using the at least one classifier. According to another embodiment, the filtering step may further include removing one or more feature point matches from a result set. According to a further embodiment, a system for filtering feature point matches for visual object recognition is provided. The system includes a hard false positive identifier, a classifier trainer and a hard false positive filter.

13 Claims, 4 Drawing Sheets

CLASSIFYING FALSE POSITIVE DESCRIPTORS

This application claims the benefit of U.S. Provisional Appl. No. 61/074,536, filed Jun. 20, 2008, which is herein incorporated by reference in its entirety.

FIELD OF THE INVENTION

Embodiments of the present invention relate to image matching and object recognition technologies.

BACKGROUND

Image matching techniques may be used in a variety of applications such as control of industrial processes, tracking, detecting events, organizing or retrieving image data, and object or place recognition.

The effectiveness of object recognition may depend on the image matching algorithm that is used by an object recognition process. An image matching algorithm may utilize a computed parameter such as a descriptor of a digital image for use by the recognition process. A descriptor of a digital image, for example, may refer to characteristics of or features found in an image. Descriptors may also be local and need not describe an entire image or an object in an image. Descriptors for different images may be compared using a variety of distance metrics to find matching regions in other images.

Some objects and simple structures, such as edges or crosses, are common features in local image patches and are likely to produce false matches when using local descriptors for object recognition. Such features often lack distinctiveness. Some methods for detecting non-distinctive descriptors have been attempted. However, many attempts fail to achieve good performance due to the difficulty in collecting a labeled dataset for training. Such attempts may also fail due to the large variety of local structures that can be shared by different objects.

Systems and methods for visual object recognition are needed that reduce false matches and improve performance of an image matching process as compared to present methods.

BRIEF SUMMARY

Embodiments of the present invention relate to systems and methods for filtering feature point matches for visual object recognition. According to an embodiment, a method for filtering descriptors for visual object recognition is provided. The method includes identifying false positive descriptors having a local match confidence that exceeds a predetermined threshold and a global image match confidence that is less than a second threshold. The method also includes training at least one classifier to discriminate between the false positive descriptors and other descriptors. The method further includes filtering feature point matches using the at least one classifier. According to another embodiment, the filtering step may further include removing one or more feature point matches from a result set that exceed a threshold matching of the one or more false positive descriptors.

According to a further embodiment, a system for filtering feature point matches for visual object recognition is provided. The system includes a hard false positive identifier configured to identify false positive descriptors having a local match confidence that exceeds a predetermined threshold and a global image match confidence that is less than a second threshold. The system also includes a classifier trainer configured to train at least one classifier to discriminate between the false positive descriptors and other descriptors. The system further includes a hard false positive filter configured to filter feature point matches using the at least one classifier.

Further embodiments, features, and advantages of the invention, as well as the structure and operation of the various embodiments of the invention are described in detail below with reference to accompanying drawings.

BRIEF DESCRIPTION OF THE FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

The effectiveness of visual object recognition is often reduced by false positive matches of images or objects. A false positive match of a whole object or image may also be referred to as a global image mismatch. Global image mismatches may be reduced by filtering local feature point matches. Feature point matches are matches of local descriptors that have been identified at local feature points of an object or image. Examples of local features may include a window corner, the top of a door, a clock hand, an edge, an eye, a tip of a mountain top, etc. Local descriptors that incorrectly report a global image match are false positive descriptors. Embodiments described herein refer to systems and methods for filtering feature point matches for visual object recognition.

Feature point matches may be filtered. They may also be reduced from a result set. Feature point matches may be filtered using classifiers. Classifiers may be trained to detect false positive local descriptors. Because of the large variety of local features that are shared by different objects, many classifiers may fail to detect non-distinct local descriptors associated with these shared local features. According to an embodiment, classifiers may be trained to focus on a smaller set of false positive descriptors, or "hard" false positive descriptors. "Hard" false positive descriptors refer to false positive descriptors that achieve a higher level of local descriptor positive matching. Accordingly, local descriptors with a lower level of local descriptor positive matching may be considered "soft" false positive descriptors. "Hard" false positive descriptors are identified from "hard" false matches. A "hard" false match is an image match in which local descriptors of an image achieve a high level of matching but result in a global image mismatch.

Figure 1:
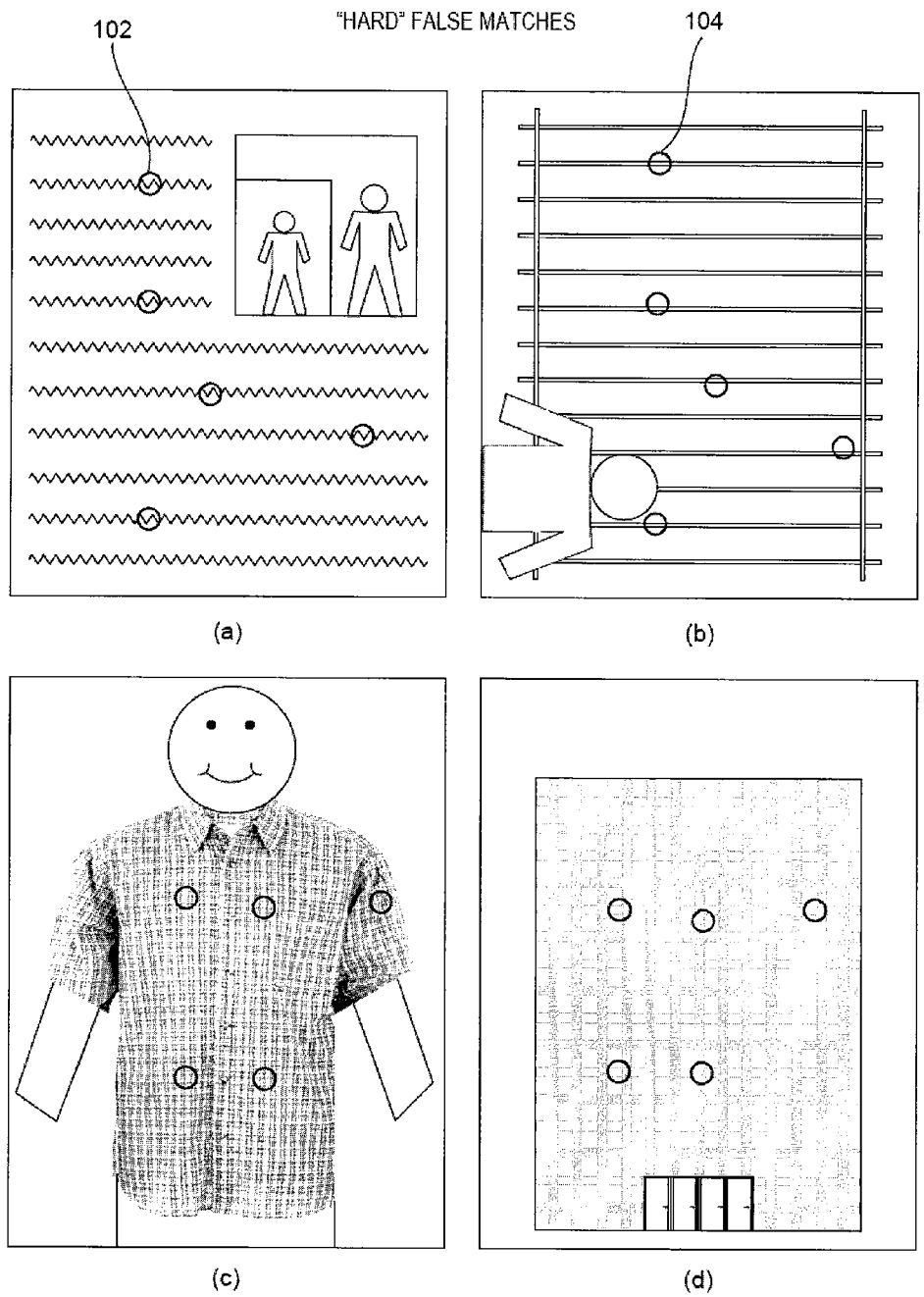
FIG. 1 illustrates "hard" false positive matches, according to an embodiment of the present invention.

To illustrate "hard" false matches, FIG. 1 shows four diagrams, (a), (b), (c) and (d), that represent objects in images that are matched using local descriptors, according to an embodiment. These diagrams represent two sets of images, (a)-(b) and (c)-(d), that are "hard" false matches. That is, each set of images are a global, image mismatch even though they have local descriptors that have a high level of matching. For example, diagram (b) represents an image that appears to be a nearest neighbor of the image represented by diagram (a). Diagram (a) represents an image of a newspaper. Diagram (b) represents a rotated image of a person in front of a fence. The horizontal lines of text of the newspaper in diagram (a) appear similar in size, length and spacing to the thin metal rods that form the fence in diagram (b). Local descriptors, such as descriptor 102 of (a) and descriptor 104 of (b), may match very well. However, the newspaper does not correctly match, resulting in a global image mismatch. Because of the high level of local descriptor matching, this global image mismatch may be a hard false match.

In a second example, the matching cross pattern on the shirt in diagram (c) is a nearest neighbor image of the building with windows represented in diagram (d). In fact, local descriptors of diagrams (c) and (d) may match very well. However, the shirt is not a correct match of the building. This may also be a "hard" false match.

Figure 2:
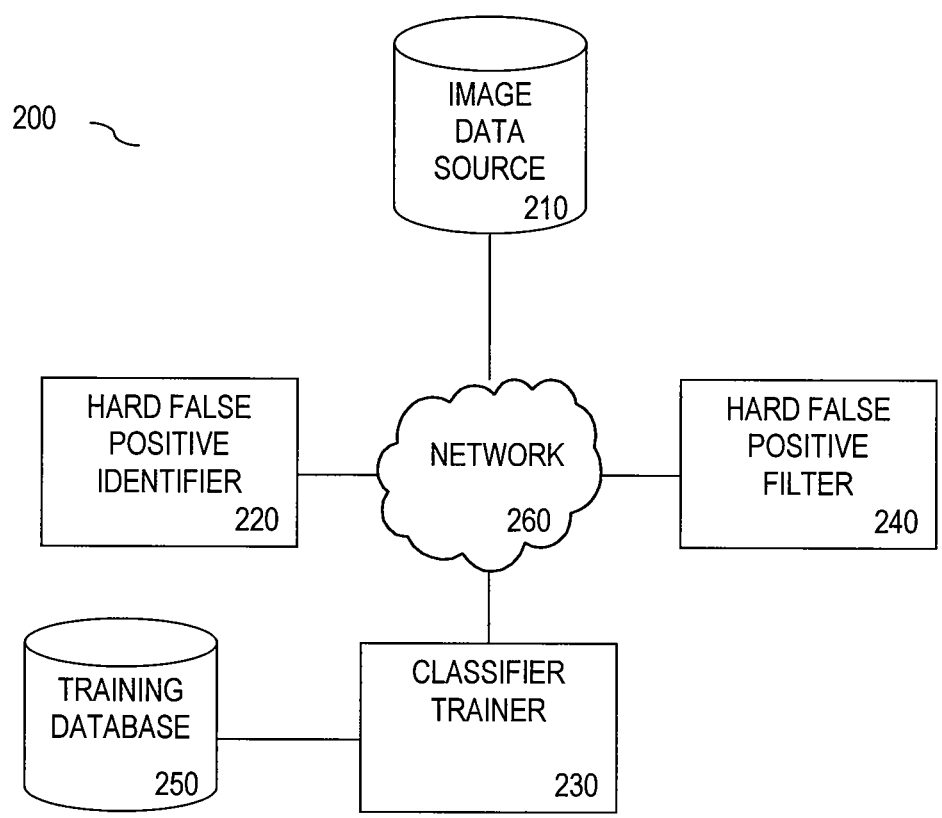
FIG. 2 illustrates a system for filtering feature point matches for visual object recognition, according to an embodiment of the present invention.

FIG. 2 illustrates an exemplary system 200 for filtering feature point matches, according to an embodiment. System 200 may include hard false positive identifier 220, classifier trainer 230 and hard false positive filter 240. False positive identifier 220, classifier trainer 230 and hard false positive filter 240 may be coupled directly or indirectly, such as over one or more networks 260. According to another embodiment, system 200 may include training database 250. Training database 250 may be coupled to classifier trainer 230 directly or indirectly.

According to a further embodiment, hard false positive identifier 220 may be coupled to image data source 210 directly or indirectly. Images and/or descriptors may be received by hard false positive identifier 220 from image data source 210. Image data source 210 may be one or more databases of images. For instance, image data source 210 may be a database that users can upload images to over the Internet. Image data source 210 may also be a local database that receives images from a local user. Image data source 210 may receive images from other databases or data sources. In another case, image data source 210 may be a data stream or data feed of images.

According to an embodiment, hard false positive identifier 220 may be configured to identify one or more false positive descriptors having a local match confidence that exceeds a predetermined threshold and a global image match confidence that is less than a second threshold. A confidence may be a value, score, probability or any other metric used to represent the likelihood that a match is a true match. A local match confidence may be a confidence score given to a match between to local descriptors. A global image match may be a confidence given to a match between two images. A threshold may be a value, score, confidence or any other metric or representation used for classifying or distinguishing levels of matches. Thresholds may be a predetermined metric or developed on the fly.

Thresholds may be set or adjusted by a human or computer in order to achieve an optimal result, according to an embodiment. For example, a matching confidence threshold may be based on a probability that a local descriptor would yield a false positive. This probability could be, for example, less than or equal to 0.1%. A threshold may be set high in order to distinguish "high" confidence local matches from other local matches. A predetermined threshold may be established so that hard false positive descriptors would exceed a given threshold. According to a further embodiment, a global image match that fails to reach a global image match threshold may be considered a global image mismatch. According to another embodiment, a confidence less than a positive matching threshold may be equivalent to exceeding a negative or false matching threshold.

As stated above, hard false positive identifier 220 may be configured to identify one or more false positive descriptors. False positive descriptors may be identified using local and global matching thresholds. According to an embodiment, a local or global threshold may be predetermined. False positive descriptors may be identified from within a single image, according to an embodiment. False positive descriptors may also be identified from across a set of images, according to another embodiment. According to a further embodiment, false positive descriptors may be identified from clusters of local feature points. Feature points of these clusters may have matching confidences that exceed a predetermined match confidence threshold subsequent to geometric and probabilistic verification. According to another embodiment, geometric and probabilistic verification may be used for local matching or global matching.

Classifier trainer 230 may be configured to train one or more classifiers to discriminate between identified false positive descriptors and other descriptors, according to an embodiment. The identified false positive descriptors may include, for example, hard false positive descriptors or descriptors having a matching confidence that exceeds a threshold. Training may include learning to detect specific matches or descriptors, such as hard false positive descriptors, from a large set of training images. For instance, a large dataset of hard false matches may be used. Training may improve as more descriptors and better descriptors are used during testing. Trained classifiers may be linear or non-linear. According to another embodiment, classifiers may be trained to discriminate between hard false positive descriptors and other descriptors by any number of methods, including, but not limited to: linear logistic regression, linear SVM, linear boosting using log-loss, neural networks (including using backpropagation with momentum), or boosting on products or stumps.

Classifier trainer 230 may be coupled directly or indirectly to training database 250, according to an embodiment. Training database 250 may include descriptors, images, classifiers, false positive descriptors, hard false positive descriptors, or any other data or tools for training classifiers. These may be stored in training database 250 from previous training exercises or received from other data sources. Data for training database 250 may be received or entered manually or automatically. Data may also be manually or automatically generated.

According to an embodiment, hard false positive filter 240 may be configured to filter one or more feature point matches in real images (or in non-training images) using one or more trained classifiers. Filtering may include removing one or more feature point matches that exceed a threshold matching of the one or more false positive descriptors. In other words, matches that have feature points that positively match hard false positive descriptors will be removed. Such matches may have a matching confidence score that exceeds a matching confidence threshold. Such feature point matches may be removed from a result set. Filtering may include reducing a scoring weight of such feature point matches. Filtering may also include altering any formula or score involving such feature point matches. According to another embodiment, hard positive filter 240 may output a result set of images.

Figure 3:
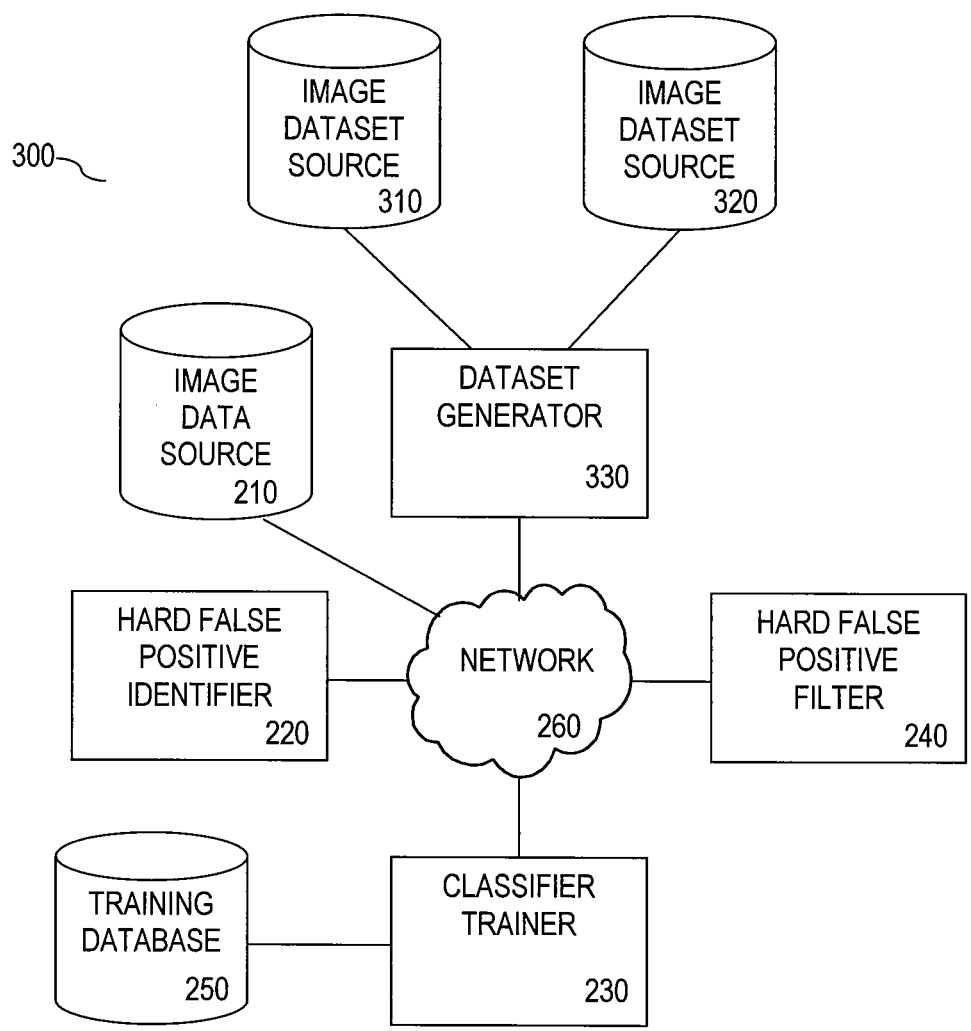
FIG. 3 illustrates another system for filtering feature point matches for visual object recognition, according to an embodiment of the present invention.

FIG. 3 illustrates an exemplary system 300 for filtering feature point matches, according to an embodiment. Whereas image data source 210 in the embodiment of FIG. 2 may provide a descriptor dataset, dataset generator 330 in the embodiment of FIG. 3 may generate a descriptor dataset from known global image mismatches. System 300 may include hard false positive identifier 220, classifier trainer 230 and hard false positive filter 240, as described in the embodiment of FIG. 2. System 300 may include training database 250. System 300 may also include image data source 210. Dataset generator 330 may be coupled to hard false positive identifier 220 directly or indirectly, such as over one or more networks 260. Dataset generator 330 may be also be coupled to training database 250 directly or indirectly. Dataset generator 330 may also be coupled to one or more image dataset sources (310-320), directly or indirectly.

According to an embodiment, dataset generator 330 may be configured to generate a dataset of false positive descriptors by matching images of a first image dataset to images of a second image dataset, wherein all images of the second image dataset are excluded from the first image dataset and wherein each image match results in a false match. With a global image mismatch assured for each match, a dataset of hard false positive descriptors may be created based upon local descriptors that have a high matching confidence score. In such a case, the second threshold that is used for global matching may be reduced or eliminated because all global image matches will likely be global image mismatches, according to another embodiment.

According to an embodiment, first image dataset may be received from image dataset source 310. Second image dataset may be received from image dataset source 320. According to another embodiment, image datasets may be received from the same image dataset source or from another location in system 300. According to a further embodiment, dataset generator 330 may use hard false positive descriptors it has stored. Dataset generator 330 may also receive existing hard false positive descriptors from another source. According to a further embodiment, a false descriptor dataset may be collected automatically using a computer. A false descriptor dataset may also be collected semi-automatically or manually. A predetermined false descriptor dataset size may be required before proceeding. According to a further embodiment, a dataset size may exceed one thousand descriptors.

Figure 4:
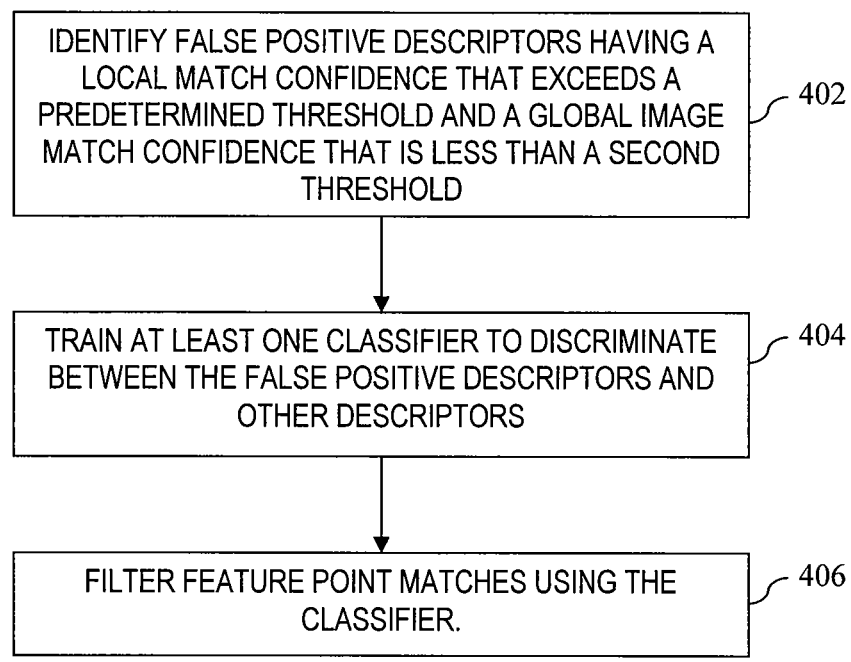
FIG. 4 illustrates a method for filtering feature point matches for visual object recognition, according to an embodiment of the present invention.

FIG. 4 illustrates an exemplary method 400, according to an embodiment, for filtering feature point matches for visual object recognition (402-406). In step 402, false positive descriptors having a local match confidence that exceeds a predetermined threshold and a global image match confidence that is less than a second threshold are identified. Step 402 may be performed, for example, by hard false positive identifier 220.

In step 404, at least one classifier is trained to discriminate between the identified false positive descriptors and other descriptors. This step may be performed, for example, by classifier trainer 230.

In step 406, feature point matches are filtered using the classifier. Step 406 may be performed using, for example, hard positive filter 240.

Aspects of the present invention, for example system 200, system 300 and/or method 400 or any part(s) or function(s) thereof may be implemented using hardware, software modules, firmware, tangible computer readable medium having instructions stored thereon, or a combination thereof and may be implemented in one or more computer-based systems or other processing systems.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for filtering feature point matches for visual object recognition comprising:
    identifying one or more false positive descriptors of a first training image, wherein each false positive descriptor comprises:
        a local descriptor having a local match confidence with a different local descriptor of a second training image that exceeds a predetermined threshold, wherein a global image match confidence between the first and the second training images is less than a second threshold;
    training at least one classifier to discriminate between the one or more false positive descriptors and one or more local descriptors; and
    filtering one or more feature point matches using the at least one classifier, wherein filtering a feature point match comprises:
        identifying the feature point match comprising a match between a first local descriptor identified at a first local feature point in a first input image and a second local descriptor identified at a second local feature point in a second input image,
        determining, from the at least one classifier, that the feature point match exceeds a threshold matching of one or more false positive descriptors, and
        in response to the determining, filtering the feature point match.

2. The computer-implemented method of claim 1, further comprising generating a dataset of false positive descriptors by matching training images of a first image dataset to training images of a second image dataset, wherein all training images of the second image dataset are excluded from the first image dataset and wherein each training image match results in a global image mismatch.

3. The computer-implemented method of claim 1, further comprising collecting a dataset of false positive descriptors, wherein a size of the dataset exceeds a predetermined size.

4. The computer-implemented method of claim 1, wherein the identifying step further comprises identifying at least one cluster of one or more local feature points having a local matching confidence that exceeds a predetermined local match confidence threshold.

5. The computer-implemented method of claim 1, wherein at least one of the predetermined threshold or the second threshold is based on a probability of less than or equal to 0.1% that a local descriptor would yield a false positive.

6. The computer-implemented method of claim 1, further comprising:
    identifying one or more a false positive descriptor within a training image.

7. The computer-implemented method of claim 1, wherein identifying false positive descriptors further comprises identifying one or more the false positive descriptors from a set of training images.

8. A system for filtering feature point matches for visual object recognition comprising:
    a hard false positive identifier configured to identify one or more false positive descriptors of a first training image, wherein each false positive descriptor comprises:
        a local descriptor having a local match confidence with a different local descriptor of a second training image that exceeds a predetermined threshold, wherein a global image match confidence between the first and the second training images is less than a second threshold;
    a classifier trainer configured to train at least one classifier to discriminate between the one or more false positive descriptors and one or more local descriptors; and
    a hard false positive filter configured to filter feature point matches using the at least one classifier, wherein filtering a feature point match comprises:
        identifying the feature point match comprising a match between a first local descriptor identified at a first local feature point in a first input image and a second local descriptor identified at a second local feature point in a second input image,
        determining, from the at least one classifier, that the feature point match exceeds a threshold matching of one or more false positive descriptors, and
        in response to the determining, filtering the feature point match.

9. The system of claim 8, wherein the hard false positive identifier is further configured to identify at least one cluster of one or more local feature points having a local match confidence that exceeds a predetermined local match confidence threshold, wherein the local match confidence is based on geometric and probabilistic verification.

10. The system of claim 8, further comprising a dataset generator configured to generate a dataset of false positive descriptors by matching training images of a first image dataset to training images of a second image dataset, wherein all training images of the second image dataset are excluded from the first image dataset and wherein each training image match results in a global image mismatch.

11. The system of claim 8, wherein at least one of the predetermined threshold or the second threshold is based on a probability of less than or equal to 0.1% that a local descriptor would yield a false positive.

12. A computer program product comprising a non-transitory computer readable medium having control logic stored therein for causing a computer to filter feature point matches for visual object recognition, the control logic comprising:
    a first set of instructions that causes the computer to identify one or more false positive descriptors of a first training image, wherein each false positive descriptor comprises:
        a local descriptor having a local match confidence with a different local descriptor of a second training image that exceeds a predetermined threshold, wherein a global image match confidence between the first and the second training images is less than a second threshold;
    a second set of instructions that causes the computer to train at least one classifier to discriminate between the one or more false positive descriptors and one or more local descriptors; and
    a third set of instructions that causes the computer to filter feature point matches using the at least one classifier, wherein filtering a feature point match comprises:
        identifying the feature point match comprising a match between a first local descriptor identified at a first local feature point in a first input image and a second local descriptor identified at a second local feature point in a second input image,
        determining, from the at least one classifier, that the feature point match exceeds a threshold matching of one or more false positive descriptors, and
        in response to the determining, filtering the feature point match.

13. The computer program product of claim 12, further comprising a fourth computer readable program code that causes the computer to generate a dataset of false positive descriptors by matching training images of a first image dataset to training images of a second image dataset, wherein all training images of the second image dataset are excluded from the first image dataset and wherein each training image match results in a global image mismatch.

* * * * *